(12) United States Patent
Sperrer

(10) Patent No.: US 7,281,403 B2
(45) Date of Patent: Oct. 16, 2007

(54) PRODUCTION DEVICE, IN PARTICULAR A FOLDING PRESS AND A METHOD FOR OPERATING A PRODUCTION DEVICE

(75) Inventor: Gerhard Sperrer, Wartberg/Krems (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 361 days.

(21) Appl. No.: 10/487,053

(22) PCT Filed: Aug. 9, 2002

(86) PCT No.: PCT/AT02/00240

§ 371 (c)(1),
(2), (4) Date: Jul. 19, 2004

(87) PCT Pub. No.: WO03/015951

PCT Pub. Date: Feb. 27, 2003

(65) Prior Publication Data

US 2004/0237617 A1    Dec. 2, 2004

(30) Foreign Application Priority Data

Aug. 17, 2001 (AT) .............................. A 1290/2001

(51) Int. Cl.
  *B21B 33/02* (2006.01)
  *B21C 51/00* (2006.01)
  *F16P 3/00* (2006.01)
  *F16D 3/06* (2006.01)

(52) U.S. Cl. ............................. 72/20.2; 72/4; 72/21.2; 72/21.3; 100/342; 192/130

(58) Field of Classification Search .................. 72/1–4, 72/21.2, 21.3, 20.1, 31.11, 31.1, 466.3, 20.2; 192/129 A, 130; 100/341, 342
See application file for complete search history.

(56) References Cited

U.S. PATENT DOCUMENTS 3,186,256 A * 6/1965 Reznick ............................ 72/1
3,710,050 A   1/1973 Richards (Continued)

FOREIGN PATENT DOCUMENTS

DE    4312565    10/1994

(Continued)

OTHER PUBLICATIONS

International Search Report; PCT Application No. PCT/AT02/00240; Filed Aug. 9, 2002; Date of Completion Dec. 6, 2002; Date of Mailing Dec. 17, 2002.

*Primary Examiner*—Derris H. Banks
*Assistant Examiner*—Teresa M. Bonk
(74) *Attorney, Agent, or Firm*—Alston & Bird LLP

(57) ABSTRACT

The invention relates to a production unit (1), in particular a bending press, and a method of operating the latter in order to shape workpieces of sheet metal between two press beams (15, 16) equipped with bending tools (36, 37) and displaceable relative to one another by means of a drive system (27), and having a control unit (47). The control unit (47) incorporates a detection system and has at least one detection means which is connected so as to communicate with the detection system in order to transmit data and/or signals.

14 Claims, 6 Drawing Sheets

U.S. PATENT DOCUMENTS

| | | | |
|---|---|---|---|
| 4,060,160 A * | 11/1977 | Lieber | 192/134 |
| 4,430,879 A | 2/1984 | Rolland | |
| 4,936,126 A * | 6/1990 | Sato | 72/20.1 |
| 5,081,406 A | 1/1992 | Hughes et al. | |
| 6,131,429 A * | 10/2000 | Ward | 72/1 |
| 6,163,374 A | 12/2000 | Otani et al. | |
| 2001/0041077 A1 | 11/2001 | Lehner et al. | |
| 2002/0070860 A1 | 6/2002 | Wuestefeld et al. | |

FOREIGN PATENT DOCUMENTS

| | | |
|---|---|---|
| DE | 196 19 688 A1 | 11/1997 |
| DE | 100 00 287 A1 | 7/2001 |
| DE | 100 26 305 A1 | 11/2001 |
| DE | 100 26 710 A1 | 12/2001 |
| EP | 0 166 351 A2 | 1/1986 |
| WO | WO 81/00750 | 3/1981 |
| WO | WO 01/14826 A1 | 3/2001 |

\* cited by examiner

PRODUCTION DEVICE, IN PARTICULAR A FOLDING PRESS AND A METHOD FOR OPERATING A PRODUCTION DEVICE

BACKGROUND OF THE INVENTION

The invention relates to a production unit, in particular a bending press for shaping workpieces of sheet metal between two press beams equipped with bending tools which can be displaced relative to one another by means of a drive system and incorporating a control unit.

Production machines such as edging presses for bending sheet metal workpieces are fitted with various known safety features to prevent accidents, such as can occur if a machine is not operated correctly, by means of which the working area in the immediate vicinity and between bending tools which move relative to one another in order to perform a work process is protected, so that an emergency stop can be operated if body parts of an operator happen to be in this protected area. One such feature known from the prior art is a "light curtain" for example whereby a beam emitter emits light beams to an oppositely lying beam receiver and the machine is stopped if the light beam is interrupted. Many such machines are also fitted with a "two-hand control" by means of which the operator must use both hands to operate separate switches or control buttons simultaneously in order to initiate the forming process, which is a reliable means of ensuring that the hands are not in the working area. However, a system of this type does not offer any protection for any person present who is not directly involved in operating the machine or against manipulation of the safety system.

A production unit is known from patent specification DE 100 00 287 A1, in particular a bending press for shaping workpieces of sheet metal between press beams equipped with tools that are displaceable relative to one another by means of a drive system. A control system has a detection system and at least one detection means which is connected so as to communicate with the detection system in order to transmit data and/or signals, in which an analysis-control module is provided, as well as a data memory. The detection means of the detection system is a camera, by means of which the immediate working area around the displaceable press beam is monitored, and image signals are continuously evaluated so that the production unit can be switched off as soon as pre-defined image patterns indicate that an operator has encroached on the immediate area presenting a risk.

Patent specification DE 196 19 688 A1 discloses a method of monitoring rooms in which machinery is operated by means of video, whereby a video camera is used as the optical detection means to monitor the operating room, and en electronically processable image of the free operating room is generated and transmitted from the camera to an image processor, where it is stored. Whenever the press is switched on, the video camera records another image of the operating room and the image processing system compares the generated image with the stored image. The press can not be operated unless the new image is identical to the stored image.

Document U.S. Pat. No. 5,081,406 A discloses a monitoring and control system for operating a machine with power-operated tools, for example a saw blade, and has a system for protecting an operator. A control and monitoring system has a detection system, by means of which capacitive changes in the area of the moved tool caused by the approach of an operator are detected and evaluated in a control circuit. If the operator moves dangerously close to the tool and thus causes a variation in the measurement values, the emergency stop of the moved tool is activated.

SUMMARY OF THE INVENTION

The objective of the invention is to propose a production unit and a method of operating the production unit, which affords operating personnel the highest degree of safety whilst operating at a high throughput rate, i.e. in short work cycles, and rules out any possibility of manipulating the safety system.

The present invention addresses the above needs and achieves other advantages, by providing a production device such as a folding press wherein the control unit has a detection system and at least one detection means is provided, which is connected so as to communicate with the detection system in order to transmit data and/or signals, and wherein the detection means is provided in the form of a contact strip disposed in a housing compartment of the bending tool projecting slightly beyond a tool tip in the direction towards another bending tool and mounted so as to be displaceable in the direction of motion of the press beam. The surprising advantage of this approach is that if deviations occur in respect of pre-defined information about the operating state of the production unit, entered in the form of desired values which indicate the existence of potential danger during operation and during the operating sequence, steps can be initiated immediately, irrespective of operation, to shut down the production unit within set tolerance values, and the higher safety standard achieved as a result enables shorter production sequences and hence higher productivity.

Another embodiment is possible wherein the detection system has an analysis-control module, whereby a range of safety-related information can be incorporated in the safety control system.

This being the case, an embodiment is of advantage wherein the analysis-control module is conductively linked to a data memory, in particular to a semiconductor memory, because all information is stored so that it can be accessed by the analysis-control module.

Also of advantage are embodiments wherein a switch contact which can be operated by the contact strip is disposed in the housing compartment of the bending tool, or wherein a proximity sensor is disposed in the housing compartment of the bending tool, whereby monitoring can be limited to the immediate tool area as the press beam is moved up to the safety distance at which the bending tools are spaced in the region of from 6 mm to 8 mm apart from one another and if an obstacle is encountered, e.g. a body part, before the safety distance is reached, the drive of the production unit is stopped and the driven press beam preferably effects a reverse movement.

Also described are further advantageous embodiments, which offer a series of technical options for reversing the motion of the tool holder device or the bending tools relative to the press beam.

In other embodiments, one or both press beams are split in the direction extending parallel to the floor and the parts can be telescopically adjustable. These embodiments are of advantage because on the one hand a rapidly reacting reversing motion is achieved due to the fact that the bending tool is split, resulting in a low mass in the area of the bending tool, and on the other an inevitable continued motion of the press beam due to its high mass is compensated.

BRIEF DESCRIPTION OF THE DRAWINGS

In order to provide a clearer understanding of the invention, it will be explained in more detail with reference to examples of embodiments illustrated in the appended drawings.

Of these.

DETAILED DESCRIPTION OF PREFERRED EMBODIMENTS

Figure 1:
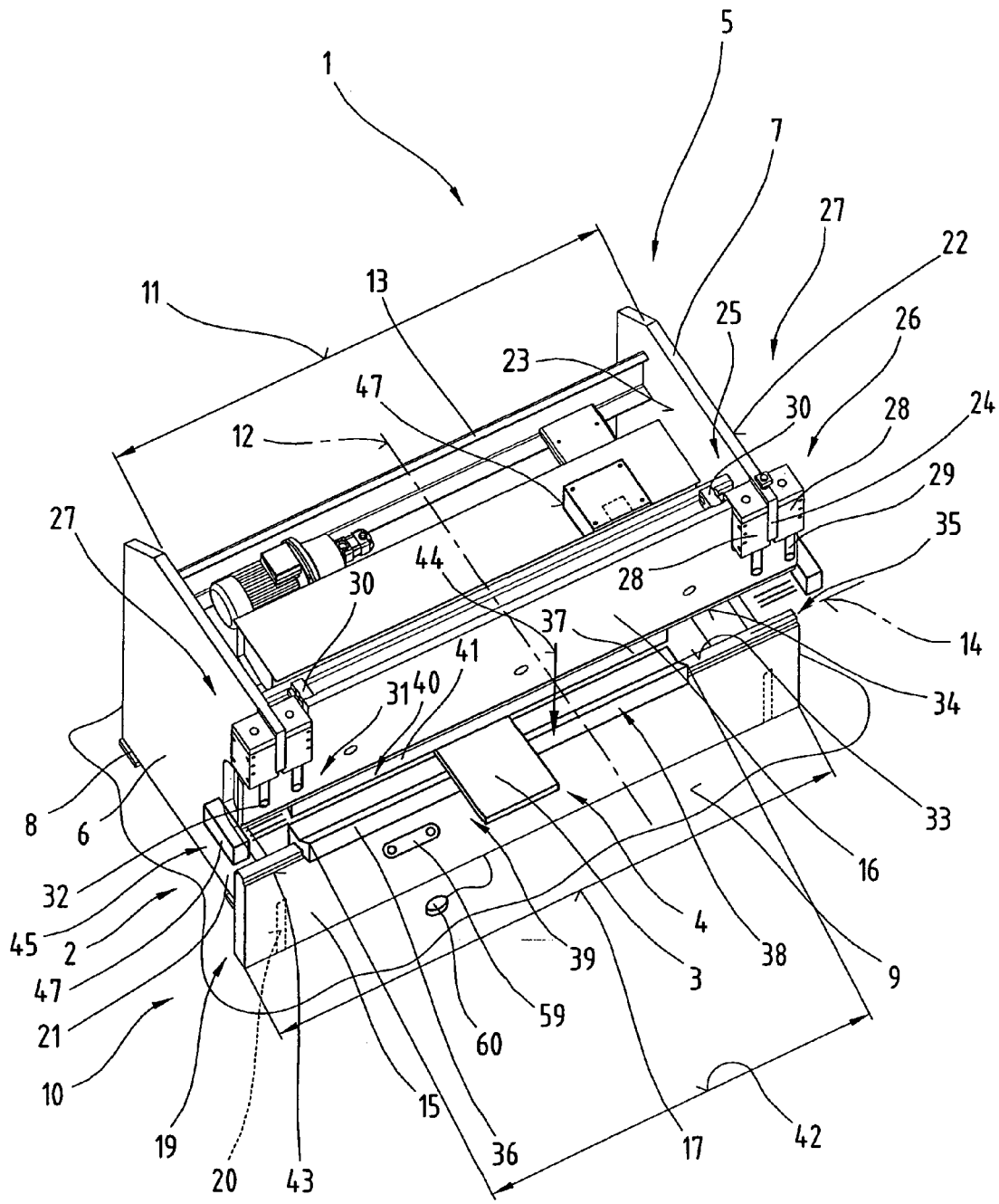
FIG. 1 is a simplified perspective view showing a production unit with the safety system proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 2:
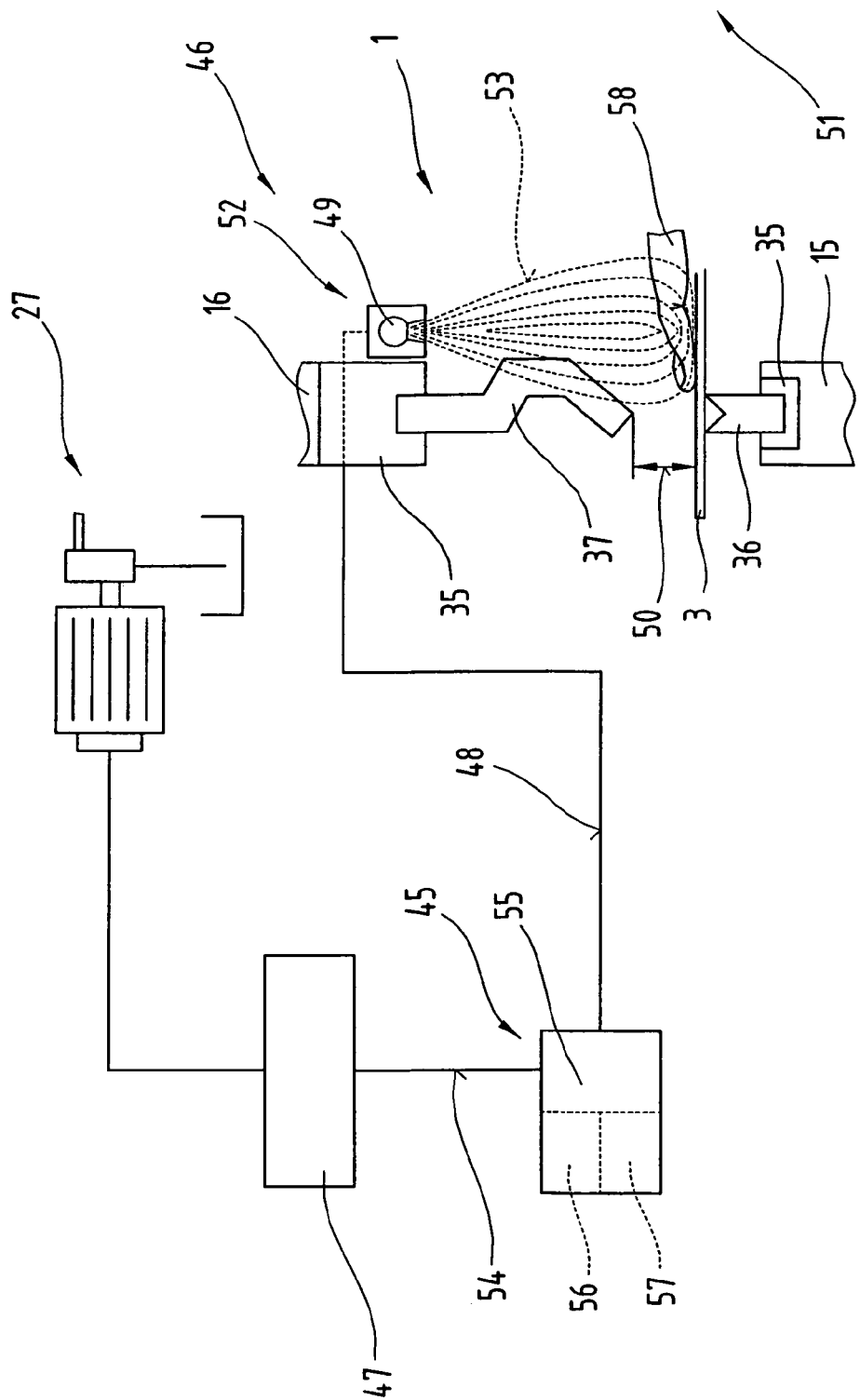
FIG. 2 is a schematic diagram showing the production unit proposed by the invention with a more detailed illustration of the safety control system.

FIGS. 1 and 2 illustrate a production unit 1, in particular a bending press 2, for shaping workpieces 3, in particular to produce housing parts 4, sections, etc. This production unit 1 may also be used to make elongate sections, such as angled sections, U-sections, Z-sections, etc., with a very high ratio of length to cross section, for example.

A machine frame 5 of the production unit 1 essentially consists of two substantially C-shaped stand-side panels 6, 7 disposed at a distance apart from one another, which are supported on a floor 9, either directly or, for example, via damping elements 8, if necessary, or in another embodiment, as illustrated in this example, secured to a common base plate 10, in particular welded thereto. The stand-side panels 6, 7 are also joined to one another across a distance 11 by means of wall parts 13 extending perpendicular to a mid-axis 12.

By reference to a working plane 14 extending parallel with the floor 9, the production unit 1 has two oppositely lying press beams 15, 16 extending across a length 17, which is generally determined by the size of the machine in question and the working length made available for bending the workpieces 3.

The press beam 15 directed towards the floor 9 is secured to the machine frame 5 by means of a fixing system 19, preferably directly on front faces 20 of legs 21 of the C-shaped stand-side panels 6, 7 assigned to the base plate 10, in particular by means of a welded joint. Provided on the side faces 22, 23 of spaced apart legs 24 of the C-shaped stand-side panels 6, 7 directed towards the floor 9 are actuator drives 25, 26 of the drive system 27, to which a pressurising medium can be applied, these being double acting hydraulic cylinders 28. Actuator elements 29, e.g. piston rods of the hydraulic cylinders 28, are drivingly connected via articulated bearings 31 and bolts, for example, to the press beam 16 which is mounted in guide means 30 of the machine frame 5 so that it can be displaced in a direction extending perpendicular to the working plane 14. The press beam 15 and the press beam 16 extend across the length 17 in a substantially symmetrical arrangement and in the direction perpendicular to the mid-plane 12, the length 17 being slightly longer than the distance 11.

On mutually facing front faces 33, 34 extending parallel with the working plane 14, the press beams 15, 16 have tool holder devices 35 for supporting and reliably attaching bending tools 36, 37. In a manner known from the prior art, these bending tools 36, 37 generally comprise a bending die 39 in the form of a die 38 and a bending stamp 41 in the form of a stamp 40. As also known from the prior art, the bending tools 36, 37 are divided into sections, so that the tool length 42 can be easily varied in order to adapt to specific requirements and also to change equipment on the production unit 1 or replace the bending tools 36, 37 more easily.

The tool holder devices 35 in the press beams 15, 16 are on the one hand designed to be releasably affixed to the bending tools 36, 37 and on the other hand form support surfaces 43 for transmitting the bending forces—indicated by arrow 44.

As may also be seen from FIG. 1, the production unit 1 is provided with a safety control system 45, which will now be explained in more detail with reference to FIG. 2. It essentially consists of a detection system 46, which is conductively connected to a control unit 47 of the production unit 1 and to at least one detection mans 49 via a line 48. The detection system 46 incorporating the detection means 49 is designed to detect a foreign object with a view to monitoring the working area directly between the bending tools 36, 37 and the safety zone in the immediate working area, in which case the workpiece 3 to be processed also falls within the foreign object detection system and must not be in contact with anything once a safety distance 50 between the bending tools 36, 37 has been exceeded. In accordance with current safety regulations, the approach speed within a range outside the safety distance 50 is slow, whereas a higher approach speed is operated within a range shorter than the safety distance 50. The detection means 49 in the embodiment illustrated as an example here is an transmitter-receiver system 52 mounted upstream of the tool holder devices 35 for the bending tool 37 in the direction of an operator 51, which emits beams, in the IR or UV range in particular, or waves, in the US or HF range in particular, extending across the length 17 of the press beam 16 to generate a beam or wave field 53 in the direction of the workpiece 3. The safety control system 45, which is connected via a line 54 to the control unit 47 of the production unit 1, has an analysis-control module 55 with a data memory 56 and a switching means 57. In order to process the workpiece 3, which might be a piece of sheet metal to be formed into a housing part 4 for example, before the production unit 1 can be set in motion, a desired data model record of the wave field needed to process the workpiece 3 placed on the bending tool 36 must be determined and detected in the data memory 56.

This detection process takes place by "two-hand operation", thereby ensuring that no foreign object, e.g. a body part 58, is projecting into the dangerous working area. Once the desired data model record has been detected, the control unit 47 is released for start-up via the switching means 57, so that the production unit 1 can be switched on either by two-hand switching means 59 or by a foot-operated switch 60.

When the workpiece 3 is ready to be subjected to a shaping process and a work stroke is initiated for this purpose, the beam or wave field 53 is activated as the bending tools 36, 37 are moved towards one another and an actual data model record is determined and then compared in the analysis-control module 55 with the desired data model record stored in the data memory 56 and, provided they match, the bending tools 36, 37 continue to be moved towards one another so that they ultimately shape the workpiece 3.

If, on the other hand, a discrepancy is detected in the analysis-control module 55 between the desired data model record and the actual data model record before the bending tools 36, 37 reach the safety distance 50 as they are moved towards one another, the switching mode in the switching means 57 is changed and a control signal is sent to the control unit 47 in order to stop the movement of the bending tools 36, 37 towards one another and reverse their direction of movement.

A safety control unit 45 of this type incorporating the detection system 46 can be used irrespective of the type of drive used for the production unit 1, e.g. an electric drive, hydraulic drive, and the reaction time at the kind of speeds used for equipment these days is approximately 5 milliseconds, in order to afford the highest possible safety for the operator 51 and any other persons who happen to be in the area but are not involved in the process, which guarantees the highest possible protection against a body part 58 being trapped at a press beam speed of 200 mm per second and making allowance for an inevitable extra travel distance.

Figure 3:
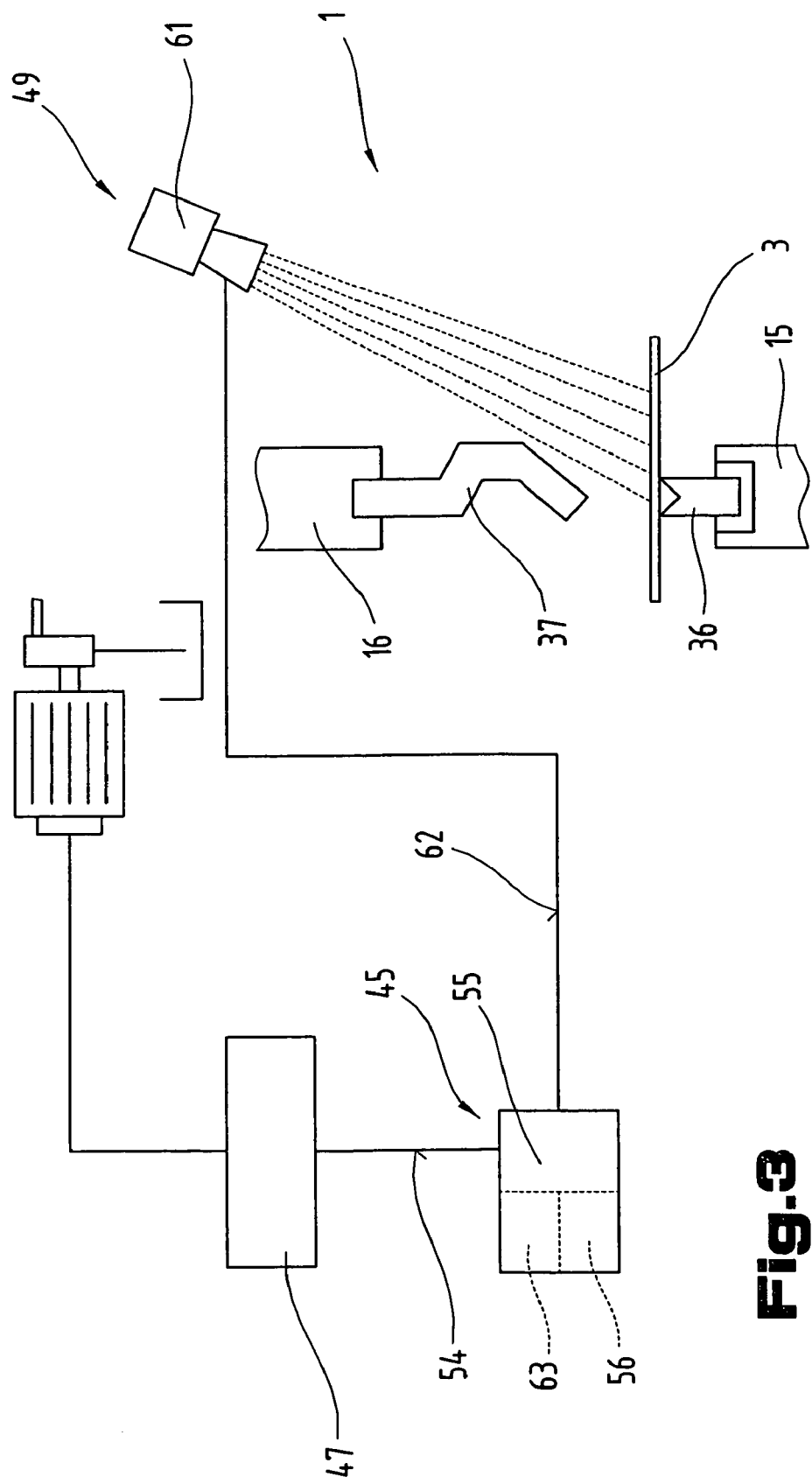
FIG. 3 is a schematic diagram showing another embodiment of a safety control system.

FIG. 3 illustrates another embodiment of the safety control system 45 for the production unit 1. In this system of protecting the production unit 1 the detection means 49 is provided in the form of at least one camera 61 which records images directly in the immediate working area and between the bending tools 36, 37. A line 62 connects the camera 61 to an image processing system 63 which co-operates with the analysis-control module 55 and the data memory 56, together constituting the safety control system 45, which is connected via line 54 to the control unit 47 of the production unit 1.

In a set-up process of the production unit 1, the workpiece 3 to be shaped is placed in position on the bending tool 36 and the situation detected by the camera 61 in the form of an image, which is processed in the image processing system 63 as image data and stored in the data memory 56 as a desired data record. The release process is operated in this way in order to record real-time operation. In this operating mode, the work area is monitored with every operating stroke of the displaceable press beam 16 to check for deviations by detecting the actual data record and comparing it with the desired data record in the analysis-control module 55, so that the production unit 1 can be stopped in the manner described above if a deviation does occur.

Consequently, whenever there is a deviation from image data determined on a one-off basis during a so-called learning process, the motion of the press beam 16 is halted if a body part 58, e.g. finger, is projecting into the monitored working area, and is so within the fixed tolerance time limit.

Figure 4:
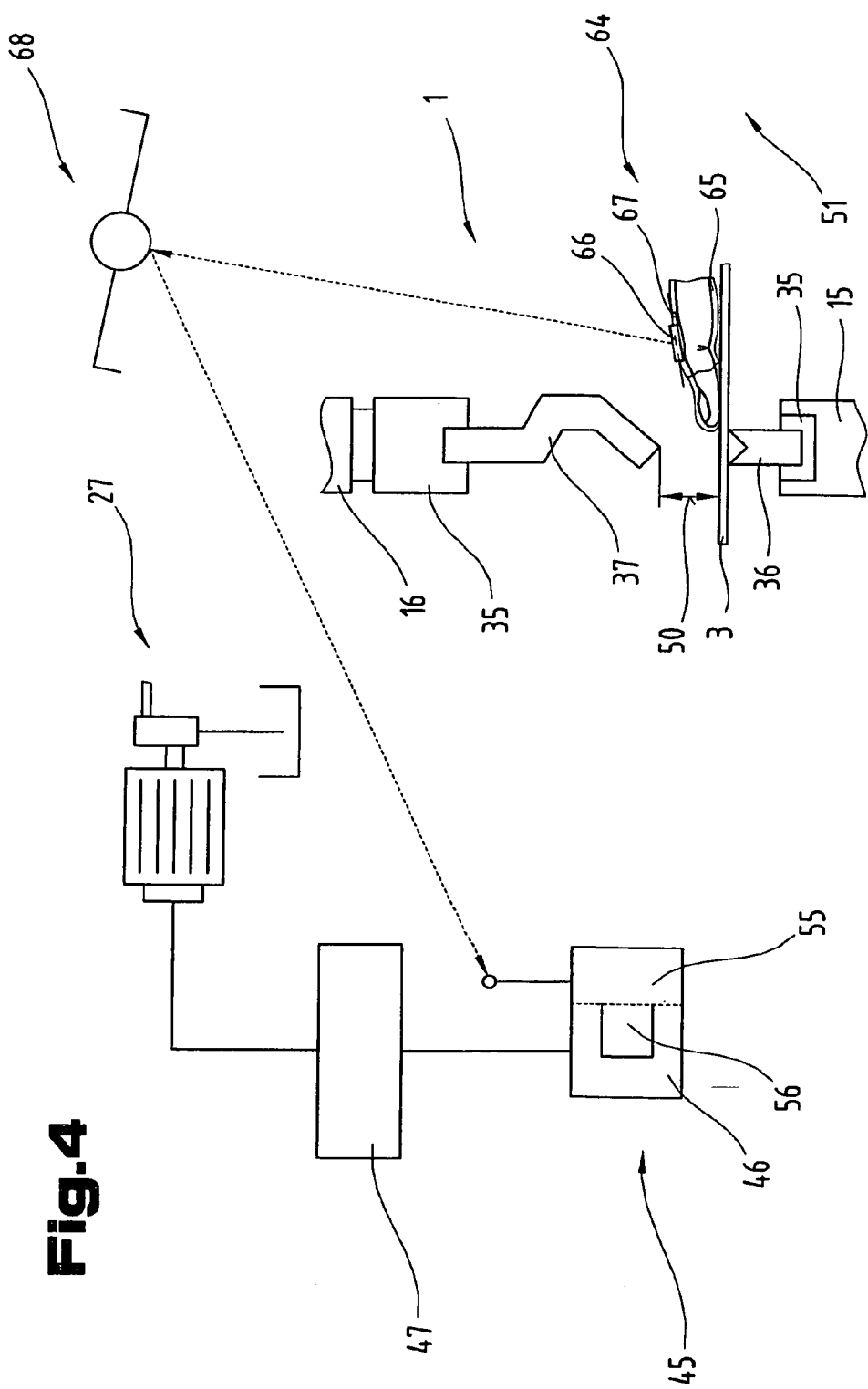
FIG. 4 is a schematic diagram illustrating another variant of the safety control system.

FIG. 4 illustrates another embodiment of the production unit with a safety control system 45. In this embodiment, the working area between the bending tools 36, 37 as well as a safety area in the direction of the operator 51 are monitored by detecting the position of both hands 64 of the operator 51, for example, the detection system 46 establishing the position of the hands 64 by satellite navigation in this instance. To this end, work gloves 65, for example, are fitted with a battery transmitter 66 and the position of the battery transmitter 66 is constantly detected in the analysis-control module 55 of the detection system 46 and used as an actual data model record, which is compared with a predefined desired data model record stored in the data memory 56 which covers positions within the entire working and safety area for example. If the navigation system detects a position of the battery transmitter 66 within the working and safety area, the emergency stop of the production unit 1 is immediately activated. In order to prevent work gloves 65 fitted with these battery transmitters 66 from being taken off and set down, i.e. not used for their intended purpose, the battery transmitter 66 may additionally be provided with a temperature sensor 67, in which case the temperature data detected by the temperature sensor 67 is also transmitted to the detection system 46 by means of radio signals, for example, thereby ensuring that the production unit 1 will not be switched on unless it is being operated correctly, i.e. only if the temperature sensor 67 indicates to the detection system 46 that the temperature more or less corresponds to body temperature. A satellite position locating system 68 of this type therefore offers effective protection against incorrect and inadmissible handling of the workpiece 3 during the shaping process on a production unit 1 of this type.

Figure 5:
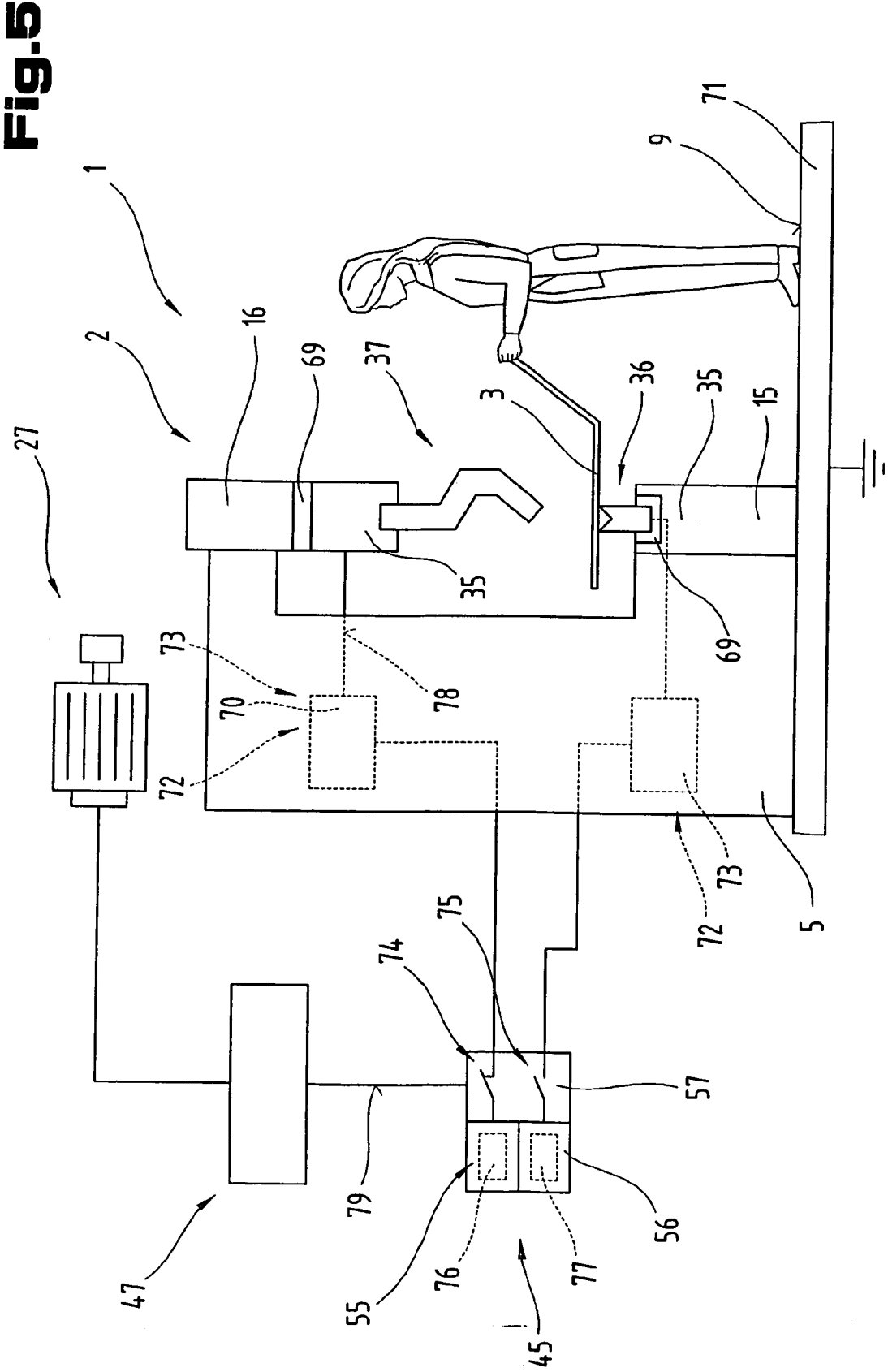
FIG. 5 is a schematic diagram illustrating another variant of the safety control system.

FIG. 5 illustrates another embodiment of the safety control system 45. In this instance, the safety control system 45 operates by checking electrical or electromagnetic characteristic values for irregularities in the working and tool area of the production unit 1 and bending press 2. To this end, individual machine components, in particular at least one bending tool 36, 37 or at least one of the tool holder devices 35 for the bending tools 36, 37, are electrically isolated from the other areas and components of the production unit 1 via electrical insulating means 69, in the form of insulating layers for example. These insulating means 69 may be provided in the form of layers or intermediate elements made from a highly stress-resistant, in particular pressure-resistant material which is not electrically conductive or is only a poor conductor. These materials used for the insulating means 69, which are preferably layers or films disposed between the bending tools 36, 37 or their holders and the other machine parts of the bending press 2, might be unbreakable plastic, mica, pertinax, insulating varnish or any other such materials known from the prior art, which simultaneously have a high resistance to pressure and high electrical insulation values, for example.

In the embodiment illustrated as an example here, the bending tools 36, 37 and the tool holder devices 35 holding the bending tools 36, 37 are electrically isolated from the press beams 15, 16 by insulating means 69. Naturally, however, it would also be possible for the insulating means 69 to be provided between at least one of the bending tools 36, 37 and the tool holder devices 36 holding and retaining them.

The essential point is that the insulating means 69 should be disposed as close to the working or bending tools 36, 37 as possible in order to minimise the risk of inducing an electric voltage in the bending tools 36, 37 at a safety-critical level. With regard to the pressure resistance and dimensional stability of the insulating means 69, it may be expedient to place it between at least one of the tool holder devices 35 and the respective press beam 15, 16 with which it is associated. A high dimensional stability is obtained due to the fact that the pressure forces are distributed over a larger surface area, even when operating at high working pressures.

The electrical insulating means 69 therefore provide so-called total insulation of at least the bending tools 36, 37 from the other frame and machine parts of the production unit 1 and bending press 2. The layout or positioning of the insulating means 69 is selected so that it is not possible, as a rule, for a phase conductor used to supply the components of the production unit 1 with power to come into contact with the bending tools 36, 37 and their tool holder devices 35. Any risks to the safety of users and operators of the bending press 2 in terms of electric shocks can therefore be ruled out. Total isolation of intrinsically conductive components is also used for hand-held power tools, such as drills, for example.

The bending tools 36, 37 and tool holder devices 35, which are virtually electrically isolated from the other parts and components of the production unit 1, are powered by at least one electrical energy source 70, in particular what is referred to as safety extra-low voltage. This safety extra-low voltage may be approximately up to 48 V, preferably approximately 24 V. In any event, the rating of the electric voltage of the energy source 70 is selected so that any health risk or safety risk for the user or operator of the production unit 1 is ruled out. The energy source 70 preferably powers the displaceable bending tool 37 with a pole of the respective electrical power. This power supply or this electric potential is checked by the safety control system 45 for irregularities or atypical states. The safety control system 45 therefore checks whether the electric characteristic values of the energy source 70 have moved outside a permissible tolerance range. If this is the case, a safety shut-down or emergency operation is initiated in the production unit 1. In order to detect safety-critical contact with machine parts by the operator 51 which pose a risk, in particular the bending tools 36, 37, the safety control system 45 may check for any change in the flow of current and/or any change in the voltage conditions of the energy source 70. If the operator 51 of the production unit 1 does come into contact with the bending tool 36 or 37 or the tool holder device 35 in a way which might be critical to safety during an active production cycle or bending process, the electrical properties of the energy source 70 will change if electric current is conducted via the body of the operator 51 to the floor 9, which is at ground potential. Contact with parts of the production unit powered with safety extra-low voltage will cause a current to flow through the body of the user to earth or ground. If such a flow of current is detected or if the voltage of the energy source 70 is interrupted, the safety control system 46 will switch the control unit 47 and at least one of the drive systems 27 of the production unit into a safety or shut-down mode. Any risk or injury to the user of the production unit is therefore avoided.

In order to improve the response of the energy source 70 in discharging the electrical energy with respect to the ground potential, the floor 9 where the operator and/or the production unit 1 stands may be covered with an electrically conductive floor covering 71. This electrically conductive floor covering 71 might be provided in the form of electrically conductive mats, which are also kinder on the health of the operator, in particular the limbs. One advantage of a good electrically conductive floor 9 or floor covering 71 higher than ground potential resides in the fact that it produces a more pronounced or clearer change in the electrical characteristic values, particularly of the flow of current or voltage from the electrical energy source 65, as soon as the operator comes into contact with safety-critical machine parts during their displacement. This will therefore enhance the detection reliability of the safety control system 45.

Being a component part of the safety control system 45 and especially because its output potential is higher than the ground potential, the energy source 70 may be conductively connected to several discharging components, in particular the bottom bending tool 36 and also the top bending tool 37. Alternatively, however, it would also be possible to provide each part or bending tool 36, 37 to be monitored with its own separate safety control system 45 or to provide each with its own separate energy source 70. As a result, it will be possible to operate safety shut-downs separately because if it is detected that the operator has come into contact with the bottom bending tool 36, the safety measures or precautions which can be taken may differ from those initiated if the contact were with the top bending tool 37 or the one that is usually moved.

The safety control system 45 in conjunction with the energy source 70 virtually form a fault current detection system for a safety extra-low voltage. This being the case, the safety control system 45 constitutes a device for shutting the production unit 1 down in order to prevent body parts of the operator, in particular fingers or hands, from being injured or crushed.

Instead of monitoring changes in the electric current or voltage by means of the safety control system 45, it would naturally also be possible to operate on the basis of other electrical characteristic values for the purpose of shutting the production unit 1 down. Such characteristic values might be defined on the basis of changes in the frequency of an electric signal, atypical changes in an electric field due to variations in capacitance or unusual changes in the electromagnetic inductance, for example. An upper and/or lower threshold value or a tolerance range is preferably set in the safety control system 45 for monitoring a change in whichever electrical characteristic value is used. If there is a drop below or rise above the predefined limit or threshold value or if there is a shift away from the pre-set tolerance range, the safety control system 45 will either forward an appropriate switch command or control signal to the control unit 47 or the respective safety measure will be initiated at the production unit 1 directly by the safety control system 45. The energy source 70 outputs only one potential of the respective electric voltage, for example the positive potential, to the respective safety-critical part, for example to at least one of the bending tools 36, 37. This will specifically result in an electric potential difference between the energy source 70 and machine part to be protected relative to the floor 9 or ground potential.

In the situation where simple current or voltage measurements are taken, the energy source 70 may be provided in the form of a transformer or a network component with low voltage output or a simple battery. The energy source 70 is preferably protected against short-circuiting and overload or its current is limited. Particularly if detecting complex electrical characteristic values, such as changes in frequency, changes in inductance or changes in capacitance, for example, the safety control system 45 may also incorporate an oscillator circuit 72 or an electrical resonant circuit 73, the electrical operating behaviour of which can be influenced or varied if the user comes into contact with safety-critical parts.

As soon as the safety control system 45 detects a change in the respective electrical characteristic value which is recognised as being critical, the switching means 57 is activated and operated. This switching means 57 may be provided in the form of a normally closed contact 74 and/or a normally open contact 75.

The safety control system 45 and the analysis-control module 55 may incorporate a software-driven micro-computer 76 connected to the data memory 56, in particular to a semiconductor memory 77. The advantage of using a software-driven micro-computer 76 for the safety control system 45 is that it also enables complex monitoring processes to be applied, which means that detection of any safety-critical contact with the production unit 1 or the workpiece 3 can be rendered more reliable. In particular, using a micro-computer 76 also facilitates the task of setting and subsequently modifying lower and upper threshold values for a safety shut-down or for initiating an emergency operating mode of the bending press 2. This micro-computer 76 of the safety control system 45 can effectively be used in a learning mode to record characteristic curves or characteristic values for a typical signal sequence during correct operation and stored in the data memory 56, at least on a temporary basis. If the safety control system 45 then detects inadmissibly high deviations from the recorded desired or reference signal sequence during subsequent operation of the production unit1 in real time or if a defined tolerance range is exceeded, the respective emergency measures can be initiated immediately, for example emergency mode of the bending tool 37. If a micro-computer 76 of this type is used for the safety control system 45, adjustments can be made to the threshold values or tolerance range at any time. This may also be necessary in particular if the machine or production unit 1 has to be set up again or different workpieces 3 have to be processed. This being the case, a new learning mode can be started and the respective new signal sequences recorded and stored in the data memory 56 or in the semiconductor memory 77 for subsequent operations of the same type.

The energy sources 70 are either placed in contact with the respective safety-critical element of the bending press 2 directly or electrically connected to the respective element via a line 78, in particular with the bending tool 36 or 37 or with the tool holder devices 35.

Naturally, the safety control system 45 may also be integrated in the actual control unit 47 for the electrical components of the production unit 1 or alternatively, as schematically indicated, connected to the control unit 47 by means of at least one line 79. As an alternative to the externally arranged electrical components illustrated here, these could be incorporated in a single unit with the production unit 1.

The safety control system 45 should be kept active at least until a gap or free space between the bending tool 37 and the workpiece 3 or bending tool 36 is so small that it would be virtually impossible for any body parts of the operator of the production unit 1 to become trapped.

Figure 6:
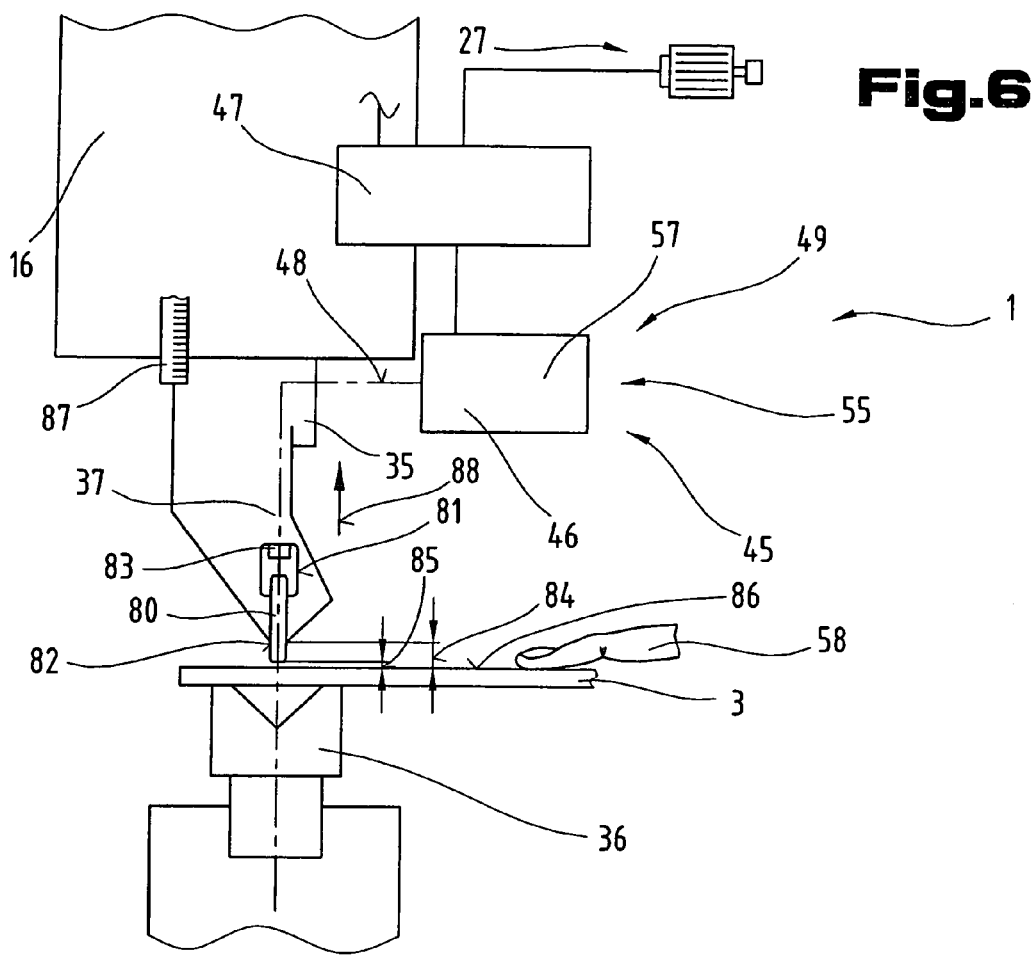
FIG. 6 is a schematic diagram illustrating another embodiment of the safety control system.

FIG. 6 illustrates another embodiment of the safety control system 45. In the embodiment illustrated as an example here, the detection means 49 is a contact strip 80 integrated in the bending tool 37, which is mounted in a slot-shaped housing compartment 81 so that it can be displaced in the direction in which the press beam 16 is moved and projects slightly out in the direction of the other ending tool 36 beyond a tool tip 82. When the contact strip 80 is in the position in which it projects out beyond the tool tip 82, it projects beyond at least one proximity sensor 83 disposed in the housing compartment 76, for example, which is electrically connected to the safety control system 45. FIG. 6 provides a detailed illustration of the operating mode used to shut down the production unit 1. Once a working stroke has started with a view to shaping the workpiece 3, the bending tool 37 is moved in the direction towards the bending tool 36, so that the contact strip 80 projects beyond the tool tip 82 by a distance 84. The safety control system 45 is activated until a distance 85 is obtained between a top surface 86 of the workpiece and the contact strip 80, the size of the distance 85 being fixed in accordance with safety regulations so that it is approximately 6 mm, thereby ensuring that once this distance 85 has been reached, no body part 58, such as a finger, is in the working area. Once this distance 85 has been reached, monitored by a position measuring device 87 and stored in the data memory 56 in the desired data model record, the emergency shut-down function is switched off and the process of shaping the workpiece 3 can then proceed at operating speed.

If the housing compartment 81 is moved in the direction towards the proximity sensor 83—indicated by arrow 88—before the fixed distance 85 is reached, a signal transmission is initiated accordingly via line 48 to the detection system 46 and the signal is processed in the safety control system 45 so that the drive system 27 is shut down and hence the production unit 1 halted via the switching means 57 and the control unit 47 electrically connected to it. As explained above, this type of emergency shut-down takes place within the range of 5 µs on equipment operated at speeds of approximately 200 mm/s, so that for a travel distance of the press beam 16 to be taken into account, the distance covered is shorter than a distance at which injuries could occur and which can be defined as being the maximum permissible deformation distance.

Naturally, various other types of known sensor systems could be used to detect the change in position of the contact strip 80 and a pressure sensor could be used instead of a proximity sensor, for example, or the contact strip 80 and the bending tool 37 could be fitted with electronic components, by means of which a relative displacement of the contact strip 80 in the housing compartment 81 can be detected.

Instead of operating a system whereby a stoppage is immediately initiated, i.e. emergency shut-down, another option would be to reverse the motion of the press beam 16, in other words operate a return stroke when the relevant switching state occurs.

Figure 7:
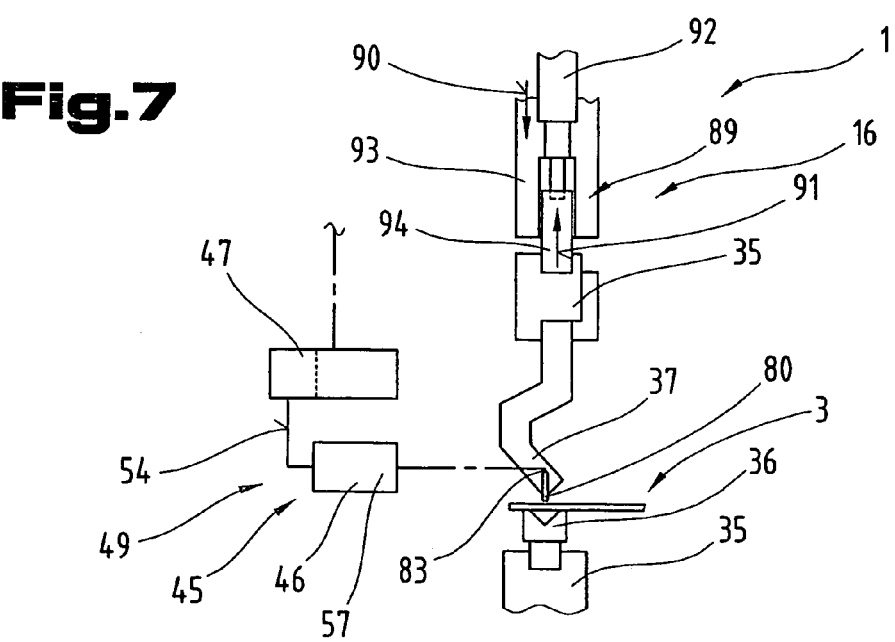
FIG. 7 is a schematic diagram illustrating another embodiment of the production machine with a safety control system.

FIG. 7 illustrates another embodiment of the production unit 1 with the safety system 45 for protecting the working area and preventing accidents. In this embodiment, the tool holder device 35 is mounted so that it can be displaced with the bending tool 37 of the displaceable press beam and relative to it by means of a displacement mechanism 89 in the direction in which the press beam 16 is moved. The displacement mechanism 89 is designed to transmit the pressing force which has to be applied in order to shape the workpiece 3 and is activated by the detection system 45 or control unit 47 so that a relative displacement takes place between the tool holder 35 and the press beam 16 if irregularities are detected in the working region by the detection means 49—the contact strip 80 in this example illustrated here—or the proximity sensor 83—as described in connection with FIG. 6 above.

As soon as the contact strip 80 is moved in the housing compartment 81 in the direction towards the proximity sensor 83, as it would be, for example, on encountering a foreign object, e.g. a body part 58, in particular a finger, before the distance 85 was reached, the switch status of the switching means 57 is switched and an emergency stop initiated. The adjusting mechanism 89 is activated simultaneously in order to start the relative displacement between the tool holder device 35 and the press beam 16. The tool holder device 35 will therefore be moved with the bending tool 37 in the direction opposite—indicated by arrow 91—the working direction—indicated by arrow 90. This provides compensation for the distance that will inevitably still be covered during an emergency stop due to the heavy mass of the press beam 16. Adjusting the tool holder device 35 will compensate for this subsequent distance, which still makes it possible to comply with the safety requirement of ensuring that the distance 80 does not fall below a fixed permissible distance in the event of an emergency stop by more than a permissible deformation distance of a body part 58, in particular the finger, without causing permanent damage, which can then be regarded as permissible.

A whole range of technical systems could be used for the adjusting mechanism 89, such as adjusting eccentrics, knee-operated lever systems, adjusting cylinders 92, adjusting spindles, etc., although these will not be explained in detail.

Naturally, as explained in respect of the previous solution, it would also be possible for the transversely split press beam 16 to be of a telescopic design, in which case the adjusting mechanism 89 could be disposed between two parts 93, 94 of the press beam 16.

For the sake of good order, it should finally be pointed out that in order to provide a clearer understanding of the structure of the production unit, it and its constituent parts are illustrated to a certain extent out of proportion and/or on an enlarged scale and/or on a reduced scale.

The objectives underlying the various solutions proposed by the invention may be found in the description.

Above all, the individual embodiments of the subject matter illustrated in FIGS. 1, 2; 3; 4; 5; 6; 7 may be construed as independent solutions proposed by the invention in their own right. The associated objectives and the solutions proposed by the invention may be found in the detailed descriptions of these drawings.

LIST OF REFERENCE NUMBERS

1 Production unit
2 Bending press
3 Workpiece
4 Housing part
5 Machine frame
6 Stand-side panel
7 Stand-side panel
8 Damping element
9 Floor
10 Base plate
11 Distance
12 Means
13 Wall part
14 Working plane
15 Press beam
16 Press beam
17 Length
18
19 Fixing system
20 Front face
21 Leg
22 Side face
23 Side face
24 Leg
25 Actuator drive
26 Actuator drive
27 Drive system
28 Hydraulic cylinder
29 Actuator element
30 Guide means
31 Articulated bearing
32 Bolt
33 Front face
34 Front face
35 Tool holder device
36 Bending tool
37 Bending tool
38 Die
39 Bending die
40 Stamp
41 Bending stamp
42 Tool length
43 Support surface
44 Arrow
45 Safety control system
46 Detection system
47 Control unit
48 Line
49 Detection means
50 Safety distance
51 Operator
52 Transmitter and receiver system
53 Wave field
54 Line
55 Analysis-control module
56 Data memory
57 Switching means
58 Body part
59 Two-hand switching mans
60 Foot-operated switch
61 Camera
62 Line
63 Image processing system
64 Hand
65 Work glove
66 Battery transmitter
67 Temperature sensor
68 Satellite position monitoring system
69 Insulation means
70 Energy source
71 Floor covering
72 Oscillator circuit
73 Resonant circuit
74 Normally closed contact
75 Normally closed contact
76 Micro-computer
77 Line
78 Line
79 Line
80 Contact strip
81 Housing compartment
82 Tool tip
83 Proximity sensor
84 Distance
85 Distance
86 Surface
87 Position measuring device
88 Arrow
89 Adjusting mechanism
90 Arrow
91 Arrow
92 Adjusting cylinder 93 Part
94 Part

The invention claimed is:

1. Production unit for shaping workpieces of sheet metal between two press beams respectively equipped with first and second bending tools that are releasably affixed to the press beams, which press beams can be displaced relative to one another in a direction perpendicular to a working plane by means of a drive system and incorporating a control unit, wherein the control unit has a detection system and at least one detection means is provided, which is connected so as to communicate with the detection system in order to transmit data and/or signals, wherein the detection means is an integral part of the first bending tool and is provided in the form of a contact strip disposed in a housing compartment of the first bending tool, the contact strip projecting a distance beyond a tool tip of the first bending tool in the direction towards the second bending tool and mounted so as to be displaceable in the direction of motion of the press beam, wherein the tool tip of the first bending tool and the contact strip lie in a common plane that also includes a bending line along which the workpiece is bent.

2. The production unit as claimed in claim 1, wherein the detection system has an analysis-control module.

3. The production unit as claimed in claim 2, wherein the analysis-control module is conductively linked to a data memory.

4. The production unit as claimed in claim 1, wherein a switch contact which can be operated by the contact strip is disposed in the housing compartment of the first bending tool.

5. The production unit as claimed in claim 1, wherein a proximity sensor is disposed in the housing compartment of the first bending tool.

6. The production unit as claimed in claim 1, wherein a tool holder device is mounted so as to be displaceable in the press beam.

7. The production unit as claimed in claim 6, wherein an adjusting mechanism is disposed between the tool holder device and the press beam for moving the tool holder device relative to the press beam in a direction away from the working plane.

8. The production unit as claimed in claim 7, wherein the adjusting mechanism is an adjusting eccentric.

9. The production unit as claimed in claim 7, wherein the adjusting mechanism is a knee-operated lever system.

10. The production unit as claimed in claim 7, wherein the adjusting mechanism is a cylinder to which a pressuring medium is applied.

11. The production unit as claimed in claim 1, wherein one of the press beams is split in a direction extending parallel with the working plane.

12. The production unit as claimed in claim 11, wherein parts of the split press beam are telescopically adjustable.

13. The production unit as claimed in claim 1, wherein the press beams comprise a displaceable press beam displaceably mounted in a machine frame of the production unit, and a stationary press beam, and wherein a distance measuring device is disposed between the displaceable press beam and the machine frame.

14. A production unit for shaping workpieces of sheet metal, the production unit comprising:
- a machine frame, and a movable press beam and a stationary press beam mounted in the machine frame, a first bending tool being affixed to the movable press beam and a second bending tool being affixed to the stationary press beam, the movable press beam being displaceable toward and away from the stationary press beam in a direction perpendicular to a working plane by means of a drive system;
- a control unit, wherein the control unit has a detection system and at least one detection means is connected so as to communicate with the detection system in order to transmit data and/or signals, wherein the detection means comprises a contact strip mounted on the first bending tool, the contact strip projecting beyond a tool tip of the first bending tool towards the second bending tool and being mounted so as to be displaceable relative to the first bending tool in the direction of motion of the movable press beam; and
- a distance measuring device disposed between the movable press beam and the machine frame and operable to monitor a distance between the contact strip and the workpiece as the movable press beam descends, wherein the control unit is operable to halt or reverse the movable press beam if the contact strip moves up relative to the first bending tool before said distance has decreased below a predetermined limit, which indicates a possible foreign object between the contact strip and the workpiece.

* * * * *